United States Patent [19]

Troyer

[11] 4,317,560
[45] Mar. 2, 1982

[54] WORK MANIPULATOR

[76] Inventor: Wade E. Troyer, 680 Gateshead Rd., Troy, Ohio 45373

[21] Appl. No.: 106,748

[22] Filed: Dec. 26, 1979

[51] Int. Cl.³ .............................................. B23K 7/10
[52] U.S. Cl. ..................................... 266/48; 269/60; 269/61; 269/71
[58] Field of Search ...................... 266/48; 269/60, 61, 269/71

[56] References Cited

U.S. PATENT DOCUMENTS

| | | | |
|---|---|---|---|
| 2,994,526 | 8/1961 | Clawson | 269/60 |
| 3,124,018 | 3/1964 | Gough | 269/60 |
| 3,514,090 | 5/1970 | Wuesthoff | 269/60 |
| 4,183,511 | 1/1980 | Marek | 269/60 |

*Primary Examiner*—W. Stallard
*Attorney, Agent, or Firm*—Jerome P. Bloom

[57] ABSTRACT

A work manipulator particularly advantageous for use in welding, cutting and like operations comprises a plurality of functionally related arms, at least a portion of said arms being respectively mounted for rotation in different planes. Means are provided for rotating said arms simultaneously or selectively as needs and to the extent required. Further means coupled to at least a portion of said arms provide as between such means and the arm to which such means is coupled a defined path of movement of one relative the other. With work holder means based on at least a portion of said arms, said arms and said coupled means are selectively or simultaneously operable to manipulate work to continuously present and move the same relative to a torch or like device at the attitude required to effect a complete continuous weld or cut with or without a change in position of the torch.

25 Claims, 7 Drawing Figures

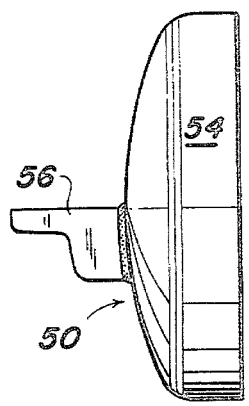
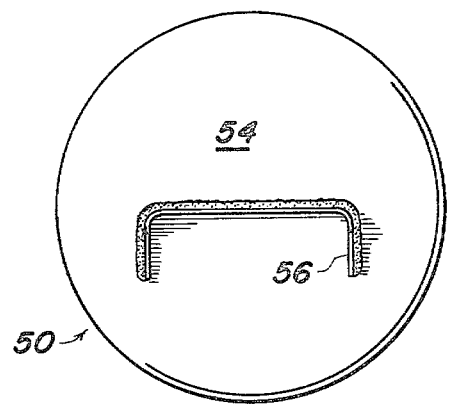
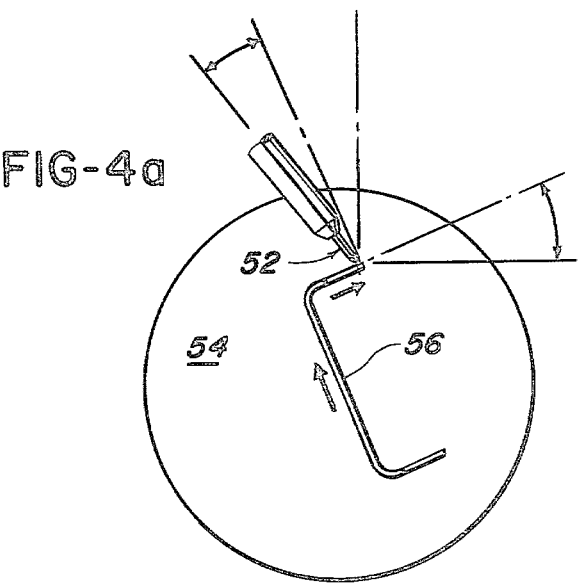
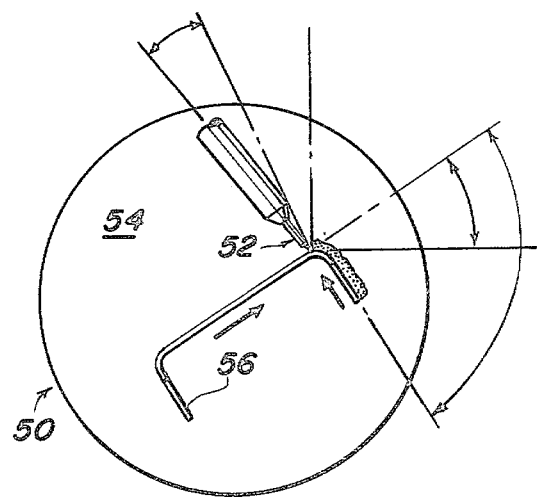
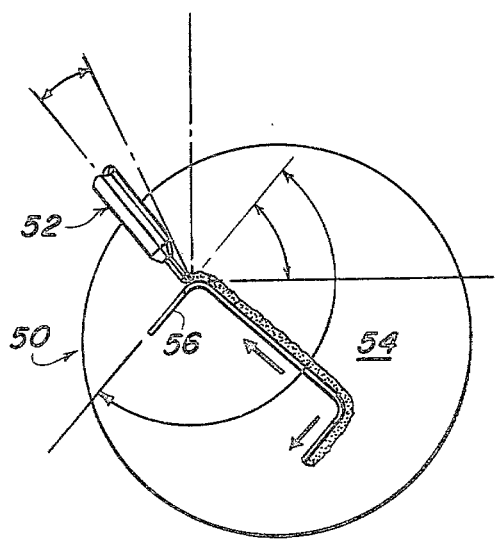

WORK MANIPULATOR

BACKGROUND OF THE INVENTION

The present invention provides an improved system and apparatus enabling the application of a torch to achieve automatic three-dimensional cutting or welding if so required. Particular uniqueness exists by reason of the ability inherent in use of the apparatus to achieve a three-dimensional cut or weld by movement of the work alone with reference to a torch the position of which is relatively limited or fixed in use.

In the long term development of the prior art no one has previously recognized or embodied in the use of a torch the concept of simply manipulating the work three-dimensionally or that this would eliminate the complexities of the torch equipment normally required to negotiate difficult part shapes. Nor has anyone previously considered a complex, let alone an effective simple structure for achieving this end result. At the same time by lending an ability of three-dimensional movement of the work one is enabled to produce a precise, cleaner and more economical operation than heretofore contemplated.

The simplicity of the invention embodiment and its practice lends itself readily to computer control. The invention therefore contributes materially to solutions of problems which have plagued the users of a torch, particularly in welding procedures, in reference to which the invention is herein described. This last is for purposes of illustration only and not by way of limitation.

As to its solution of problems of the prior art, the benefits of the invention, for example, as applied to welding, may be seen as follows:

1. It affords means for total and precision manipulation of work, in one, two or three-dimensional patterns, to present even difficult corners or recesses in the surface thereof at the best attitude for welding.
2. It enables manipulation of the work so that its position relative the torch will enable the torch, even fixed in place, to be positioned to produce the most favorable angle between the torch centerline and a tangent to the work surface at the point where the tool will act or arc.
3. It produces an improved penetration and fusion and facilitates higher deposition rates of weld material in use in a welding application and higher productivity in any case whether it be welding, cutting or surfacing.
4. It can eliminate the need for highly skilled labor such as heretofore deemed necessary in use of prior art apparatus.

Invention embodiments thus solve complexities of the prior art and enable quicker, better, cleaner and less costly torch operations.

The prior art of which the inventor is aware in the field of the invention, in none of which does he find anticipation, comprises the following patents and publications:

| U.S. PAT. NO. | |
|---|---|
| | 4,042,161 |
| " | 3,133,186 |
| " | 3,469,068 |
| " | 3,443,732 |
| " | 4,121,084 |
| " | 3,532,807 |
| " | 4,063,064 |

-continued

| | |
|---|---|
| " | 3,268,805 |
| " | 3,511,965 |
| " | 3,852,561 |
| " | 3,819,902 |
| " | 4,046,263 |
| " | 3,832,522 |
| " | 3,742,184 |
| " | 4,071,732 |
| " | 4,093,844 |
| " | 3,694,621 |
| " | 3,264,447 |
| " | 4,095,085 |
| " | 3,517,159 |
| " | 3,786,224 |
| " | 3,842,236 |
| " | 3,875,366 |
| " | 3,895,602 |
| " | 3,974,381 |
| " | 4,017,708 |
| " | 4,054,771 |
| " | 4,131,484 |
| " | 4,143,261 |
| " | 3,619,550 |
| " | 3,736,402 |
| " | 4,016,396 |
| " | 4,019,015 |
| " | 4,088,890 |
| " | 4,125,754 |
| " | 4,143,260 |
| " | 4,147,917 |
| " | 4,156,125 |
| West German Appln. | 2,738,066 |
| Shiu Meiwa Data | PW 150 A, B |

SUMMARY OF THE INVENTION

The embodiments of the present invention provide for one, two and three-dimensional manipulation of work to continuously maintain the point thereon at which the torch arc must act in any instance at a desired distance from, and with its surface in the required angular relation to, the torch. They also enable precisely controlled work motion, whether continuous or intermittent, as needs require.

The simplest form of its embodiment provides a motor fixed in connection with one face of a frame member which is rigidly fixed as to its position. A channel shaped arm has a center of one face thereof coupled to the motor drive shaft, for rotation thereby. The channel of this arm is closed at its respective ends by fixedly connected bearing means through which projects a screw type shaft. This shaft nests in and extends longitudinally of the channel of this arm and is fixed therein against endwise motion. A second motor mounted to one closed end of the arm is drivingly related to the shaft. Mounted for movement on and longitudinally of the face of the arm remote from the first motor is a slidable block which bridges the open channel and bears on the bounding edges of its side walls. The screw shaft extends through and threadedly engages a nut-like projection fixed to the inner face of the slidable block, which is thereby caused to move in a linear path and in a plane parallel to that of the adjacent surface of the arm on which it slides as the screw shaft is rotated in place. The slidable block is thus arranged for rotation about a defined axis and in a defined plane and may be moved within this plane in a straight line path.

A second arm fixedly connected to the slidable block projects at right angles to the first arm, and has a third drive motor fixed to one face thereof at its projected extremity. The drive shaft of this motor projects to connect to one face of a second channel-shaped arm at its center. A screw shaft nested in the channel of this arm is assembled thereto by means and in the manner of the screw shaft first described and has similarly interconnected therewith a drive motor and a block which on rotation of the screw shaft moves in a linear path, bearing on the adjacent arm. The arrangement provides that this second channel-shaped arm and the apparatus assembled thereto are adapted to rotate about an axis perpendicular to that of the drive shaft of the first mentioned motor, in an arcuate path and in a plane in which the block thereof may be moved in a straight line path, outwardly from and generally perpendicular to the line of movement of the first slidable block.

Fixed thereto in abutted relation to the outermost face of this second slidable block is a similar type block the outermost face of which has a nut-like projection through which a third screw shaft extends and to which this screw shaft is threadedly engaged.

This third screw shaft bearingly mounts in longitudinally spaced plates fixed to project perpendicularly from the back of a work holder. This latter screw is also fixed against endwise motion and has drivingly related thereto a fourth motor. On rotation of this last shaft the block to which it is threadedly engaged (which is restrained from rotation with the shaft) will move in a linear path and carry therewith the work holder which presents the work to be welded to an adjacent torch.

The invention embodiment enables rotation of a workpiece in either of two planes or both and simultaneously a composition of linear movement in one, two or three directions, each at right angles to the other. Thus, one may have a universal adjustment of work to be welded to most effectively apply a torch with or without a movement of the torch. The movement of the torch is not required per the present invention.

A particularly unique feature of the preferred invention embodiment is that it provides the ability for the centerlines of the drive shafts of those motors utilized as rotors for inducing selective rotation of the embodied arm or arms, or their equivalent, to be continuously maintained, in manipulation of work, so as to intersect at that point where the arc produced by the applied torch must act on the work at any given instant. An object of the invention is to provide apparatus having this capability and means to facilitate its achievement.

It is therefore a primary object of the invention to afford the art with improved means and methods for manipulating workpieces to insure a better, more effective operation thereon by a torch, as in a welding or cutting procedure.

A further object is to provide a work manipulator of simple structural form having the capability of producing substantially universal movement of the work and providing in the process that a torch may continuously have a desired relation thereto.

A further object is to provide a means and method for manipulating work relative a torch for welding, cutting and like purposes possessing the advantageous structural features, the inherent meritorious characteristics and means and mode of use as herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not necessarily the only form of the embodiment of the invention is shown, FIG. 1 is a generally schematic showing, in perspective, of a structural embodiment of the present invention;

FIGS. 3a and 3b show a side and front view of a tank head and a bracket welded to its outer convexly contoured face; and FIGS. 4a, 4b and 4c diagrammatically illustrate steps in the welding of the bracket to the tank head.

Like parts are indicated by similar characters of reference throughout the several views.

Figure 1:
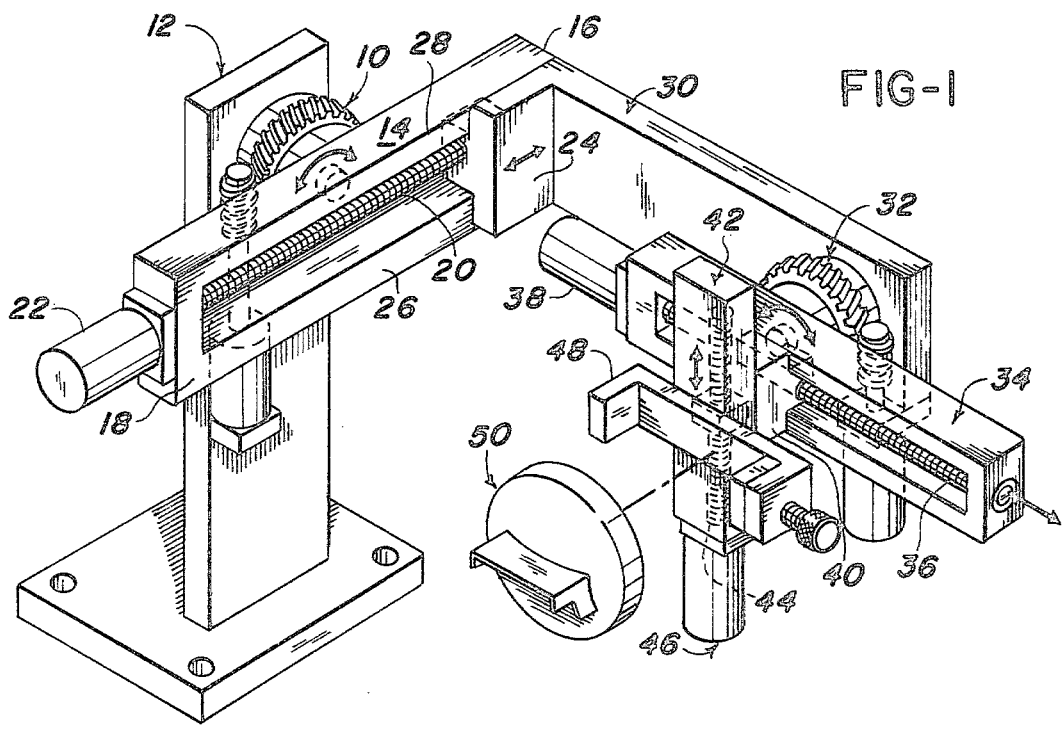

An embodiment of the present invention is schematically shown in FIG. 1 to include a drive motor 10 fixed to one face of a rigidly anchored vertical frame member 12. An elongate generally rectangular channel-shaped beam forming a slide arm 14 is fixed at the center of one face forming the base thereof to the drive shaft of the motor 10. The arm 14 is generally U-shaped in cross-section and closed to each of its opposite ends by attached transversely oriented bearing plates 16 and 18, respectively.

A screw formed shaft 20 nested in the channel of the arm 14 has one end bearing in the end plate 16 as it extends within and longitudinally of the channel to have its opposite end project through and bear in the plate 18. A second motor 22 is coaxial with and drivingly coupled to the end of shaft 20 which projects outwardly from the bearing plate 18. Conventional means are provided to fix the shaft 20 against axial movement during rotation thereof in use.

A block 24 is mounted in bridging relation to the open side of the channel of the arm 14 and seated in bearing relation to the projected edges of its longitudinally extending side wall portions 26 and 28. A projection from the inner face of the block 24 having the general form of a nut disposes in and transversely of the channel to have the shaft 20 project therethrough, in threaded engagement therewith. Thus, on energization of the motor 22 the screw shaft 20 will rotate in place, as a consequence of which the block 24 will move longitudinally of the shaft and in a linear path lengthwise of the arm 14 and parallel thereto, the direction depending upon the direction of rotation of the drive of the motor 22.

To this point it may be seen, therefore, the arm 14 will rotate about the axis of the drive shaft of the motor 10 and simultaneously therewith or independently thereof the block 24 may move in a longitudinal path which is radial to the drive shaft of the motor 10.

A rectangular arm 30 is end mounted in a fixed perpendicular relation to the face of the block 24 outermost from the arm 14. The arm 30 therefore orients in a sense perpendicular to the arm 14 and shares the movements of the block 24, with or independently of a rotation of the arm 14.

Adjacent its projected extremity, the arm 30 mounts on one face thereof a motor 32 the drive shaft of which is coupled to the center of the base of a second elongate generally rectangular channel-shaped beam forming a slide arm 34. As in the case of the arm 14, the arm 34 is U-shaped in cross-section and closed to each of its opposite ends by transversely oriented bearing plates. Moreover in this case also a screw formed shaft 36 nests in the channel of the arm to have one end bearing in one end plate as it extends within and longitudinally of the channel to have its opposite end project through an opening in the remote bearing plate and outwardly thereof where it is coupled to the drive shaft of a fixedly mounted motor 38. A block 40 having a nut-like projection disposed within and transversely of the channel of the arm 34 otherwise bridges the opening to the channel and bears upon the projected edges of its side wall portions. Its nut-like projection receives therethrough and in threaded engagement therewith the shaft 36, which is fixed against endwise motion as it rotates. The arrangement is such that the motor 32 may be operated to independently rotate the arm 34 about the axis of its drive shaft and the motor 38 may be energized to move the block 40 in a sense longitudinally of the arm 34 and correspondingly in a linear path. The direction of movement of block 40 will correspond to the direction of the rotation of the drive motor 38.

Coupled to the block 40 at the face thereof remote from the arm 34 is an integrated block including a central projection in the form of a nut which positions in and transversely of the channel defined by a third elongate generally rectangular channel-shaped beam providing a slide arm 42. Nested in this channel and extending longitudinally thereof is a screw-formed shaft 44 which passes through the nut, in threaded engagement therewith. The shaft 44 is fixed in the channel against endwise motion and bears for rotation in an end plate closing one end of the channel in the arm 42 while at its opposite end it projects through a similar bearing plate to be there coupled, outwardly thereof, to the drive shaft of an attached motor 46. The arrangement of the arm 42 places it parallel to the planes of the arms 30 and 34 and orients it in a sense perpendicular to the arm 34. The arm 42 will therefore partake of the motion of the arm 30 and/or 34 or may be moved independently thereof in a sense perpendicular to the direction of movement of the block 40 on arm 34, on energization of the motor 46. The outermost face or base of the channel member 42 remote from the drive motor 32 forms part of a work holder 48 which is schematically illustrated to be in the form of a vise-type U-shaped clamp oriented at right angles to the longitudinal extent of the arm 42. This work holder 48, the form of which will suit the particular application, may be used to clamp, for example, a structure 50 parts of which are to be welded or cut so as to present the working area facing outwardly of the clamp to the operating end of a torch 52.

Figure 2:
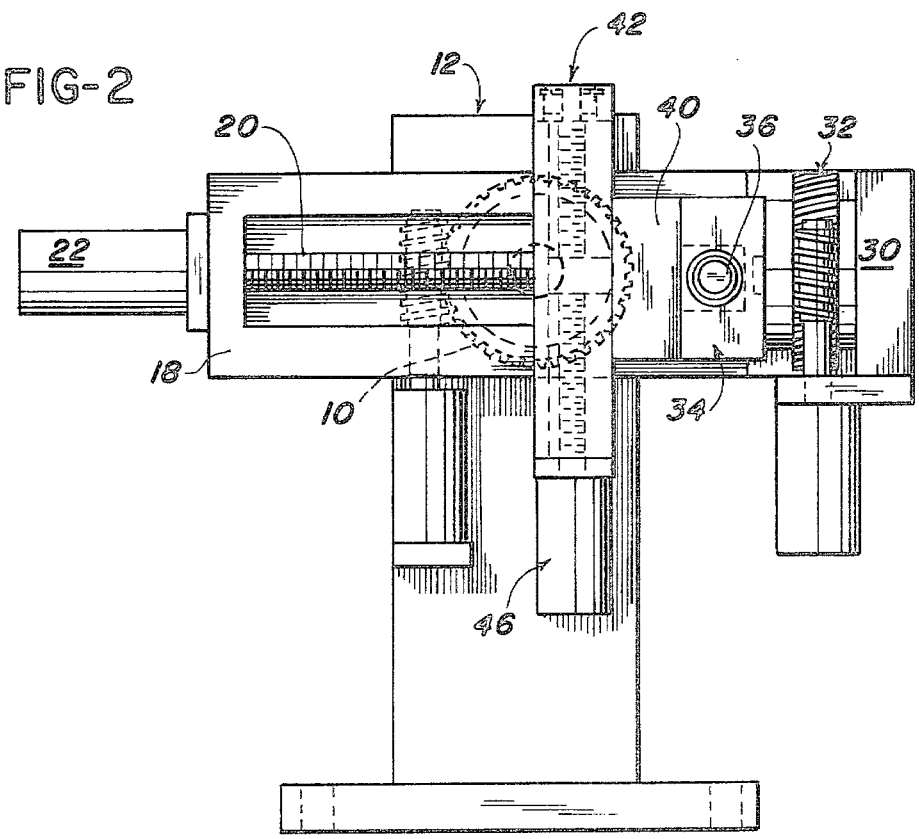
FIG. 2 is a similar view taken from one side of the arrangement shown in FIG. 1.

It is to be understood, as first indicated, that the structural arrangement portrayed in FIGS. 1 and 2 of the drawings is purely schematic and that as long as the principles indicated by the drawings are observed, the respective component parts may be fabricated in various manner and shape by those versed in the art. What the schematic shows, however, represents the basics of an embodiment of the present invention. As may be seen from the schematic, there are in effect three arms each of which is interconnected with a slide block through the medium of a connection between an embodied screw shaft and a nut. Looking more particularly to FIGS. 1 and 2, it may be seen that as the drive motor 10 is energized the arm 14 may be rotated incrementally and in a selected direction in one plane as the slide block 24 may be selectively driven in each of opposite directions and in a linear path the direction of which produces a corresponding movement of the arm 30. This last will carry with it the arms 34 and 42 and the work holder 48, together with the attached apparatus to be worked. At the same time the drive motor 32 may impart increments of rotation, simultaneously, to both the arms 34 and 42 while at the same time the slide block 40 may move in a direction the line of which is perpendicular, or angularly related to that of the line of movement of the slide block 24. At the same time, since the arm 42 has a further direction of movement in a plane parallel to that in which arms 30 and 34 may rotate, as the motor 46 is energized, the arm 42 may be caused to move relative the slide block 40 in a line which is perpendicular to the line of movement of the slide block 40 on arm 34.

The net result of the foregoing is an ability to selectively utilize the various motors to produce incremental movements of the connected parts in simultaneously effected or independently effected patterns. The whole will be dictated by the contour of the parts to be welded. By virtue of this arrangement it may be seen that, should one desire, one can achieve an essentially universal manipulation of the position of the apparatus 50 being worked, and in the process provide that the torch 52, even fixed in place, will be positioned at all times to produce the most favorable angle between the torch center line and a tangent to the work surface at the point where the tool will act or arc. The invention as illustrated does provide means for total and precision manipulation of work in one, two or three-dimensional patterns at any time so that the most difficult lines or contours to be welded will be at the best attitude for the application of the torch thereto. In addition, due to the optimal control enabled by the simplicity of the invention structure, which lends itself to automatic usage utilizing computers, one enables less than skilled labor to produce a precise, cleaner and more economical welding or cutting operation than possible with the prior art. Complexities are essentially eliminated and there is insured an attitude of the apparatus worked to provide improved penetration and fusion as well as high rates of deposition of weld material in a welding application.

A particularly unique capability of the invention, exhibited in the described embodiment, derives from the slide block interconnection of the interrelated arms which enables that the center lines of the drive shafts of the motors 10 and 32 may be constantly maintained so as to intersect at that point where the arc produced by the applied torch must act on the work at any given instant.

FIGS. 3a and 3b illustrate work effected by apparatus of the invention as above described, this apparatus 50 comprising an element 54 used as the head of a tank and a bracket 56 welded to its outer convexly configured face. As will be seen, in achieving the weld one must consider three dimensions. FIGS. 4a, b and c may be observed to appreciate the fact that the torch 52 may be held in place while the three-dimensional aspects of the weld line are taken care of totally by a manipulation of the work to which the torch is applied. It will be obvious, of course, that in the first instance there will be means provided in connection with the work holder to hold the bracket 56 to the dome-like surface of the tank head 54 in the location desired.

As seen diagrammatically in FIG. 4a the general line of the weld is in two senses at right angles to each other, following a U-shaped configuration. The third dimension to be considered in the presentation of the work to be welded is the convex contour of the tank head which must be accommodated to achieve the best possible weld.

Thus, in FIG. 4a the weld is commenced by positioning the work at the proper attitude and so one end of the line of weld to be effected, which corresponds to the projected extremity of one end of the U-shaped cross-section of the bracket 56, is positioned at the operating end of torch 52. The center line of the torch operating portion, in the case illustrated, is caused to be positioned to have a lead angle with respect to a perpendicular to the tangent to the line of the surface portions of the work at the point where welding occurs. The positioning of the work provides that the first linear portion of the weld line is inclined for optimal deposition of the weld material and rate thereof, insuring penetration and good fusion. Utilizing computer control or otherwise, one may clearly see that the various considerations in the contour and direction of the weld line may be signalled to the various motors of the apparatus of FIGS. 1 and 2 by which the apparatus 50 being worked is commonly supported. There can be patterns fully considering three dimensions as far as dictating the position at any instant of the point of the work presented to the torch which must act thereon.

In the case at hand we find the line of the weld necessitating a turning of the work, in a rotational sense, first in a clockwise direction, with the torch position maintained as to its center line. During the movement of the work or the welding the total of the work contour must be considered and will be accommodated as the work is moved to maintain the weld line optimally in relation to the torch.

To explain somewhat more particularly, the schematic drawings of FIGS. 4a, b and c exhibit the flexibility and versatility of the application of the invention apparatus and its three-dimensional capabilities as follows. The one shorter arrow in FIG. 4a indicates a linear factor of the movement of the work as it is manipulated to weld first along one leg of the "U" shape of the required weld, considering a two-dimensional aspect of its cross section. A third-dimensional increment of movement is simultaneously achieved, where required, in a direction outwardly of the plane illustrated in the drawing, as required by the contour of the tank head. Rotational input is applied as dictated by the path of the weld. The second and heavier arrow shown in FIG. 4a along the base of the "U" is indicative of a linear factor of bias or movement of the work to insure an attitude and position of the work so the location of the point of intersection of the drive shafts of motors 10 and 32 will be at that point where the arc of the torch must apply and must act at any particular instant. FIG. 4b illustrates further the similar factors of movement the application of which is enabled in use of the invention apparatus as the weld in this case is continued through the joint between the first leg of the weld and the elongate base portion of its eventual "U" shape cross section. In this latter case the factor of movement of the work to maintain the work at its required position and in a sense biased to the torch to insure its proper attitude with respect to the torch is illustrated by the short broad arrow. In any case the arrangement provides that the arc of the torch, by reason of the manipulation of the work, will act at the intersection of the center lines of the drive shafts of motors 10 and 32 as previously described. FIG. 4c shows as well and further the directional, including rotational, factors of movement or bias applied to the work as the welding operation proceeds to the third leg of the cross section of the contour of the weld which is parallel to the first.

The whole line of weld is of course predetermined by its configuration and contours and information in this respect may be readily introduced into computer controls for optimum automation. This is a significant feature in the capabilities afforded by embodiments of the present invention.

The welding operation has not been further detailed since the foregoing should make it clear to one versed in the art that the apparatus provides an ability to achieve the various increments of motion and direction of the work necessary to maintain the weld line with respect to the torch, at all times, whether the movements of the part involved are intermittent or continuously applied.

While the schematic representation of the arm 42 and the work holder 48 illustrates them as distinctively separate parts, it nevertheless remains that this is purely for representing the concept. These parts may be integrated in various manner and take various form. It still remains that the parts of the apparatus are connected one to the other in series relation and give a flexibility of relative movement to all, referenced to a common base. Given the present disclosure, those versed in the art may certainly apply the principles and structure in various fashion and with a degree of versatility dictated by the needs of the particular application.

While the disclosure has referenced itself to use of the generally universally applicable work manipulator particularly with respect to a torch the center line of which is relatively fixed or limited as to its position, it should be obvious that, if desired, one can provide conventional degrees of manipulation of the torch while still reaping the benefits of the present invention. It remains that utilizing the invention one can more economically and more effectively weld or cut, even with unskilled labor, and achieve an optimally desirable end result.

One may summarize the invention capabilities by defining the embodiment thereof as a holder for manipulating work and applying it to a torch or other tool for welding, cutting or surfacing along any line or contour involving one, two or three-dimensional patterns comprising a base adapted to be established in a fixed position, a plurality of arms or their equivalents supported by said base, at least a portion of which arms have means connected therewith also supported on said base for applying thereto, selectively or simultaneously as required, rotational and/or linear increments of movement of the work in selected directions and planes, the construction and arrangement providing three dimensional capabilities of movement of the work held and in the case illustrated substantially complete flexibility for presenting, solely by manipulation of the work, that point on which a torch must act corresponding to the intersection of the center lines of the drive motors 10 and 32 which are used for rotation of the arms 14 and 34. Of course, particularly significant is the series relation of the arms or their equivalents which is provided in the simplified and preferred embodiment of the invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is be be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A work manipulator particularly advantageous for use in applying to the work a tool such as a welding or cutting tool comprising a plurality of functionally related arms, at least some of said arms being mounted for movement in different planes, means for moving said arms selectively and/or simultaneously including means for selectively rotating said arms simultaneously or selectively, means coupled to a portion of said arms to provide as between such means and the arm to which such means is coupled a defined path of movement of one relative the other, and work holder means coupled to at least a portion of said arms, said arms and said coupled means being selectively and/or simultaneously operable to manipulate work held by said work holder means to continuously present and move the same relative to a tool at the attitude required to effect a continuous weld or cut with or without a change in position of the tool.

2. Apparatus as in claim 1 wherein said arms, said means coupled thereto and the moving means are constructed and arranged to provide a substantially universal mount for the work applied to said work holder means.

3. Apparatus as in claim 1 or claim 2 wherein there are two of said arms rotatable in different planes and said planes are at substantially right angles to one another.

4. Apparatus as in claim 1 or claim 2 wherein there are three said arms, all of which are rotatable, and said arms are displaced as to their physical locations to be rotatable in part or simultaneously in different planes.

5. Apparatus as in claim 1 or claim 2 wherein there are three said arms, all of which are rotatable, and said arms are displaced as to their physical locations to be rotatable in part or simultaneously in different planes, said arms at least in part being arranged for rotation in planes which are perpendicular to one another.

6. Apparatus as in claim 1 or claim 2 wherein there are three said arms, all of which are rotatable, and said arms are displaced as to their physical locations to be rotatable selectively or simultaneously in different planes, said arms at least in part being arranged for rotation in planes which are perpendicular to one another, and said arms at least in part being rotatable in parallel planes.

7. Apparatus as in claim 1 wherein there are a plurality of said coupled means, each coupled to one of said arms for relatively conjoint movement therewith and one of said arms is movable relative to its said coupled means in a defined path.

8. Apparatus as in claim 7 wherein said coupled means move in respective paths which are at substantially right angles to one another.

9. Apparatus as in any one of claims 1, 2, 7 and 8 wherein said paths are linear in character.

10. Apparatus as in any one of claims 1, 2, 7 and 8 in combination with a tool applied to welding and/or cutting wherein said tool is positionable in a relatively fixed position as to its center line or the central axis of rotation thereof and said work manipulator is constructed and arranged to totally manipulate the applied work to the extent required for the work to be done by said tool.

11. Apparatus as in any one of claims 1, 2, 7 and 8 wherein said arms are coupled to each other so a rotational movement of one may impart a rotational movement of another.

12. Apparatus as in claim 1 wherein the construction and arrangement of said arms, said coupled means, and said rotating means provide both series and parallel relationships between said arms as one is connected to another.

13. Apparatus as in claim 1 wherein said arms, said coupled means and said rotating means provide for three dimensional movement of the work applied to said work holder.

14. Apparatus as in claim 1 wherein said work holder is applied to one of said arms and said one of said arms is linked to the other of said arms.

15. Apparatus as in claim 14 wherein said arms are relatively displaced and mount so said one of said arms is endowed with the capability of movement independent of the other of said arms.

16. A holder for manipulating work and applying it to a tool for welding, cutting or surfacing along any line or contour involving one, two of three-dimensional patterns, comprising a base adapted to be established in a fixed position, a plurality of arms or their equivalents supported by said base, at least a portion of said arms having means connected therewith also supported on said base for applying thereto, selectively and/or simultaneously, rotational and/or linear increments of movement in selected directions and planes, at least a portion of said arms being adapted to mount work holder means, the construction and arrangement providing three-dimensional capabilities of movement of the work held by said work holder means.

17. Apparatus as in claim 16 wherein said arms are connected and constructed and arranged to establish a series relation thereof as one connects to the other.

18. Apparatus as in claim 17 wherein a portion of said arms are established to maintain a parallel relation of the planes in which they function.

19. Apparatus as in claim 18 wherein one of said arms per se is linearly movable.

20. Apparatus as in any one of claims 16, 17, 18 and 19 wherein programmed computer means are connected to feed the necessary signals to energize drive motors embodied in connection with said arms to cause said work holder to present the points of the work at which the applied tool must act to the tool, with the work at the prescribed attitude for optimal results.

21. A work manipulator particularly advantageous for use in applying to the work a tool comprising a plurality of functionally related arms and means mounting said arms including means for selectively and/or simultaneously moving said arms, said moving means including selectively operable means for the selective rotation of one or more of said arms and means for the selective movement of one or more of said arms in a linear path, work holder means coupled to a portion of said arms, said arms being mounted and arranged to be selectively and/or simultaneously moved to manipulate said work holder to continuously present and move the work held thereby at the attitude required to effect a continuing working thereof by an applied tool without change in the position of the tool.

22. A work manipulator as in claim 21 wherein said arms and said moving means are constructed and arranged to provide a substantially universal mount for the work applied to said work holder means.

23. Apparatus as in claim 21 wherein said arms are coupled to each other so a rotational movement of one may impart a rotational movement to another of said arms.

24. Apparatus as in claim 21 wherein the construction and arrangement of said arms and their moving means provide both series and parallel relationships between said arms.

25. Apparatus as in claim 21 wherein said arms and said moving means are constructed and arranged to provide for three dimensional movement of the work applied to said work holder.

* * * * *

UNITED STATES PATENT AND TRADEMARK OFFICE
CERTIFICATE OF CORRECTION

PATENT NO. : 4,317,560
DATED : March 2, 1982
INVENTOR(S) : Wade Troyer

It is certified that error appears in the above—identified patent and that said Letters Patent is hereby corrected as shown below:

Col. 1, line 16, "elminate" is corrected to read -- eliminate --

Col. 9, line 36 (Claim 3, line 1), following "2", insert -- or claim 21 --;

line 40, (Claim 4, line 1) following "2", insert -- or claim 21 --;

line 44, (Claim 5, line 1) following "2", insert -- or claim 21 --;

line 50, (Claim 6, line 1) following "2", insert -- or claim 21 --;

line 53, (Claim 6, line 4), "selectively" is corrected to read -- in part --.

Col. 10, line 22, (Claim 14, line 1) following "1", insert -- or claim 21 --;

United States Patent and Trademark Office

CERTIFICATE OF CORRECTION

PATENT NO. : 4,317,560
DATED : March 2, 1982
INVENTOR(S) : Wade Troyer

It is certified that error appears in the above—identified patent and that said Letters Patent is hereby corrected as shown below:

Col. 10, line 31, (Claim 16, line 3), "of" is corrected to read -- or --.

Col. 11, line 3 (Claim 21, line 14), -- a -- is inserted following "without".

Signed and Sealed this

Twentieth Day of July 1982

[SEAL]

Attest:

GERALD J. MOSSINGHOFF

Attesting Officer

Commissioner of Patents and Trademarks